United States Patent Office 2,836,954
Patented June 3, 1958

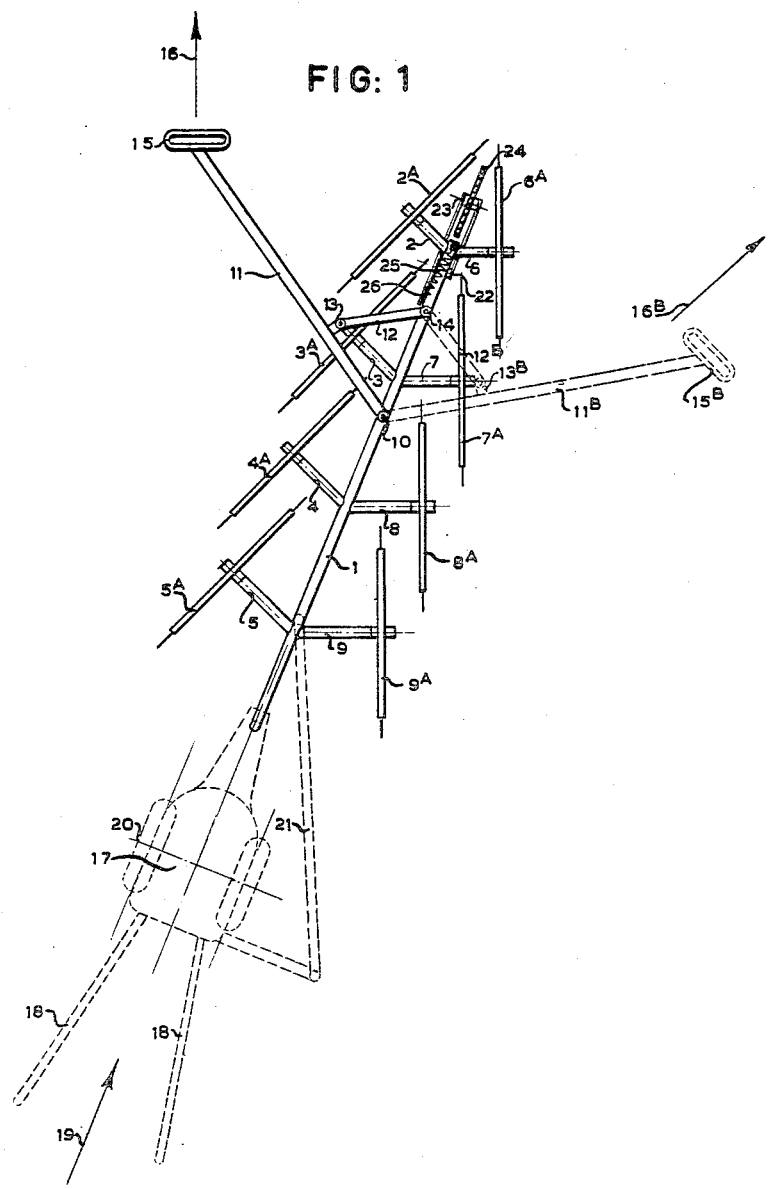

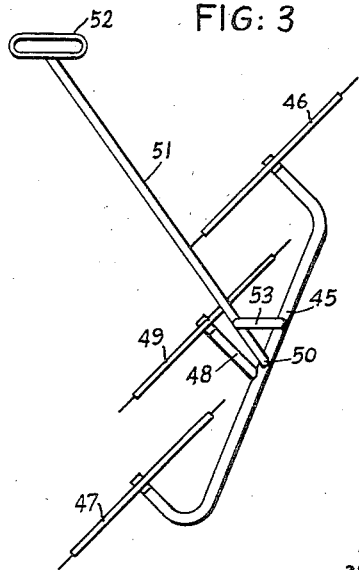
FIG: 3
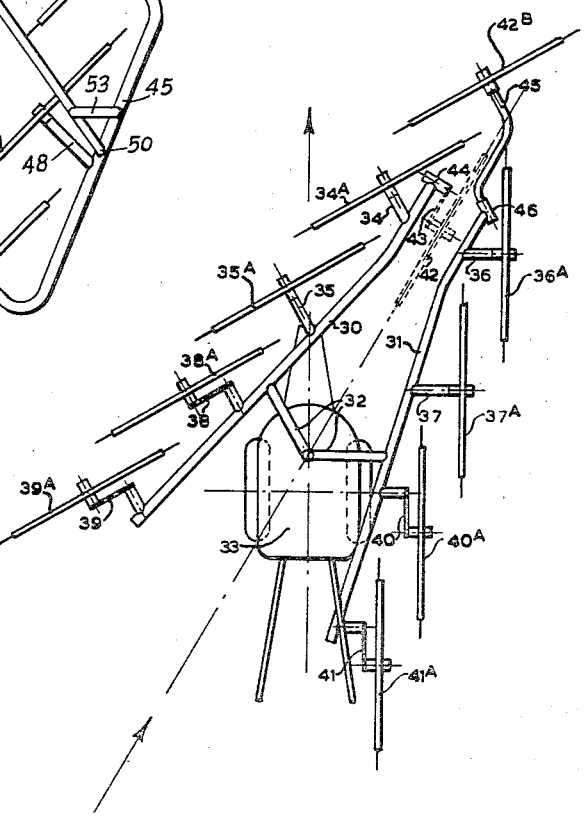
FIG: 2

2,836,954

ROTARY RAKING DEVICE WITH THE RAKING WHEELS SERVING AS GROUND SUPPORTS

Cornelis van der Lely and Ary van der Lely, Maasland, Netherlands, assignors to C. van der Lely N. V., Maasland, Netherlands, a Dutch limited company of the Netherlands Application August 19, 1954, Serial No. 450,904

Claims priority, application Netherlands August 27, 1953

2 Claims. (Cl. 56—377)

This invention relates to devices for laterally displacing material lying on the ground.

In known devices of this kind, rake wheels may be employed and these are usually provided with means for reducing wheel pressure on the ground. A frame is further provided for carrying the rake wheels and this frame is normally supported by a number of running wheels which carry not only the frame, but also at least a part of the weight of the rake wheels.

It is an object of the present invention to provide a device in which running wheels may be reduced in number or even wholly omitted. Thus according to the invention, at least one rake wheel is provided for supporting the associated frame.

The invention will be more fully described with reference to the accompanying drawings in which preferred embodiments of the invention have been illustrated by way of example and in which:

Fig. 1 shows a plan view of a first embodiment of the invention,

Fig. 2 is a plan view of a further embodiment of the invention, and

Fig. 3 shows a plan view of a still further embodiment of the invention.

In Fig. 1, the raking device includes a support or frame 1 having rigidly fixed thereto, on one side, axles 2, 3, 4 and 5 for rake wheels 2A, 3A, 4A and 5A and, on the other side, axles 6, 7, 8 and 9 for rake wheels 6A, 7A, 8A and 9A, respectively. Each rake wheel may be of conventional structure such as those shown in Patent No. 2,635,411 (Hicks; April 21, 1953). On the beam 1, at about in the middle thereof, is attached by means of a bolt 10, a bar 11 which is a draft means or means for subjecting the beam 1 to a force causing a ground traversing movement. The angle between said bar and the beam 1 is defined by a tie rod 12 arranged between a lug 13 on the bar 11 and a lug 14 on the beam 1. The free end of the bar 11 has a coupling device such as a handle 15 permitting the rake to be drawn forward in the direction of the arrow 16. In this case the overlapping rake wheels 2A—5A will deliver the material to the left, whereas the vertical planes through the rake wheels 6A—9A are parallel to the travelling direction, thus enabling said wheels to rotate over the ground without sliding. The weight of the frame, which is very small in this construction, is substantially entirely supported by the wheels 6A—9A, although to some very slight extent also by the vertical component of the tractive force applied to the handle 15. The handle 15 should be positioned to keep the wheels 2A—5A at a somewhat higher elevation than the wheels 6A—9A whereby wheels 6A—9A will perform a rolling movement to support the load so that no separate running wheels will be required.

It will be understood that the rake wheels 6A—9A do not serve exclusively for supporting the frame, but have several other functions. Firstly, the wheels 6A—9A constitute spare rake wheels which can be interchanged with the wheels 2A—5A if the latter become disabled. Secondly, the handle 15 can be displaced to the other side of the beam 1, the parts 11, 12 and 15 then assuming positions 11B, 12B and 15B, after which the device may be drawn forward in the direction of the arrow 16B so as to be supported by the rake wheels 2A—5A with the raking function being performed by the wheels 6A—9A.

The displacing of the bar 11 is so simple that no difficulty will be encountered in performing this operation at the end of each swath, for example, lying on a slope and to then rake with the opposite set of wheels in the opposite direction. The advantage of this method of working is that it is possible to deliver material easily and continually down a slope while moving back and forth.

Fig. 1 shows in dotted line that the device can also be moved in the direction of arrow 19 by means of a tractor 17 provided with bars 18 for steering. In this case, the beam 1 is arranged at right angles to the axle 20 of the tractor and is furthermore supported by a system 21 of bars. For this use, it is important that the beam 1 carries a front fork 23 which is rotatable about a horizontal axle 22 on which is rotatably mounted a disc 24 provided with circumferential irregularities and extending in the direction of the arrow 19. A spring 25, the upper end of which is fixed above the beam 1 is connected by its lower end to an arm 26 integral with the fork 23 so that the disc 24 is pressed against the ground.

To use the device driven by a tractor as above described, it is moved in longitudinal direction in the middle of a swath which is divided lengthwise into two parts. This splitting of the swath is initiated by the disc 24 pressing down the material between the wheels 2A and 6A. The material of a swath thus divided and spread to dry more quickly.

The device of Fig. 2 may also be employed selectively for raking to the left (the position shown), for raking to the right and for speading swaths. In this case, the frame is composed of two beams 30 and 31 connected together by bars 32 which may be locked in the required positions with respect to the tractor 33. The locking means may be conventional as shown, for example, in Patent No. 2,447,359 (Morrill; August 17, 1948; see element 32).

The foremost part of each beam 30, 31 respectively carries two fixed axles 34, 35 and 36, 37 on which rake wheels 34A, 35A and 36A, 37A are mounted. The rear end of each beam 30, 31 carries cranks 38, 39 and 40, 41, respectively, on which rake wheels 38A, 39A and 40A, 41A are mounted. The rake wheels on the beam 30 as well as those on the beam 31 are arranged in overlapping relation. In the position shown, the rake wheels 34A, 35A, 38A and 39A are raking wheels and the remaining rake wheels are supports when the rake is moved. The wheels 36A and 37A assist in supporting the foremost part of the frame. The position of the frame can readily be adjusted so that the rake wheels on the beam 31 do the raking and the rake wheels mounted on the beam 30 function as supporting members.

The device may also be used for swath spreading, in which case the frame 30, 31 is used in a centered position with respect to the tractor 33. The function of the disc 24 of Fig. 1 is accomplished in Fig. 2 by a rake wheel 42 which is used for swath spreading and is mounted on a crank 43 supported in a bearing 44 at the front of the beam 30. When the device is not used as a swath spreader, the rake wheel 42 may be otherwise disposed as the rake wheel 42B completing the series of rake wheels on the beam 30 as shown in Fig. 2. This arrangement is important when the device is used as a V-shaped rake.

In Fig. 2, the rake wheel 42B is mounted by means of a crank 45 in a bearing 46 at the front of the beam 31.

Fig. 3 shows a very simple embodiment of a side delivery rake according to the invention. The very light frame is composed of a support 45 the foremost end of which carries a rake wheel 46 and the rearmost end of which carries a rake wheel 47. In the middle of the support 45, an axle 48 is fixed for a third rake wheel 49. At 50, an impelling means such as a draw bar 51 is fixed to the support 45, said bar passing arcuately over the top of the rake wheels and terminating in a handle 52 for manipulating the device. In order to prevent rotation of the bar 51 with respect to the beam 45, a retaining bar 53 is provided between these parts at 50.

The various embodiments of the invention serve to illustrate the unusual utilization of rake wheels as essentially the sole supports for the frame of a raking device whereby is effected a great economy in and simplicity of construction.

What we claim is:

1. A device for laterally displacing material lying on the ground comprising a frame, ground supported rake wheels operatively associated with said frame and arranged in raking inter-relationship, and draft means operatively associated with said frame, said wheels constituting the sole support for said frame.

2. A device for laterally displacing material lying on the ground comprising a frame, ground supported rake wheels operatively coupled to said frame and arranged in raking inter-relationship, and means operatively coupled to said frame for subjecting the same to a force for causing a ground traversing movement, said wheels constituting the sole support for said frame.

References Cited in the file of this patent

UNITED STATES PATENTS

| | | |
|---|---|---|
| 2,371,076 | Stevens | Mar. 6, 1945 |
| 2,635,411 | Hicks | Apr. 21, 1953 |
| 2,674,077 | Thornton | Apr. 6, 1954 |
| 2,680,343 | Enos | June 8, 1954 |